(12) United States Patent
Neumann

(10) Patent No.: US 6,204,800 B1
(45) Date of Patent: Mar. 20, 2001

(54) METHOD FOR MONITORING THE EARTH SURFACE

(75) Inventor: Christoph Neumann, Biemerstetten (DE)

(73) Assignee: Daimler-Benz Aerospace AG, Munich (DE)

( * ) Notice: Subject to any disclaimer, the term of this patent is extended or adjusted under 35 U.S.C. 154(b) by 0 days.

(21) Appl. No.: 09/202,139

(22) PCT Filed: Apr. 4, 1998

(86) PCT No.: PCT/EP98/01980

§ 371 Date: Dec. 9, 1998

§ 102(e) Date: Dec. 9, 1998

(87) PCT Pub. No.: WO98/45726

PCT Pub. Date: Oct. 15, 1998

(30) Foreign Application Priority Data

Apr. 9, 1997 (DE) .............................. 197 14 698
Aug. 19, 1997 (DE) .............................. 197 35 848

(51) Int. Cl.⁷ ....................................... G01S 13/90
(52) U.S. Cl. .............................. 342/25; 342/26; 342/104; 342/106; 342/190; 342/191; 342/192; 342/195; 342/196
(58) Field of Search ................... 342/21, 22, 25, 342/26, 63, 64, 175, 189–197, 104–117, 176–181

(56) References Cited

U.S. PATENT DOCUMENTS

| 4,924,229 | | 5/1990 | Eichel et al. . | |
|---|---|---|---|---|
| 5,172,118 | * | 12/1992 | Peregrim et al. | 342/25 |
| 5,172,119 | * | 12/1992 | Young et al. | 342/25 |
| 5,172,120 | * | 12/1992 | Slawsby et al. | 342/25 |
| 5,173,703 | * | 12/1992 | Mangiapane et al. | 342/25 |
| 5,185,608 | * | 2/1993 | Pozgay | 342/25 X |
| 5,969,662 | * | 10/1999 | Hellsten | 342/25 |

FOREIGN PATENT DOCUMENTS

| 4311754C1 | 6/1994 | (DE) . |
|---|---|---|
| 4427657A1 | 2/1996 | (DE) . |
| 0449303A2 | 10/1991 | (EP) . |

* cited by examiner

*Primary Examiner*—Bernarr E. Gregory
(74) *Attorney, Agent, or Firm*—Venable; George H. Spencer; Allen Wood

(57) ABSTRACT

The invention relates to a method for monitoring the earth's surface with a moving aircraft using a radar sensor with a synthetic aperture. In order to produce high resolution radar images, the flight parameters of the aircraft are also required. According to the inventive method, key parameters, such as speed and acceleration, are detected in the sight line of the radar sensor from the radio signals received. One of the advantages of the invention is that an inertial navigation system (INS) is no longer required for this purpose.

14 Claims, 4 Drawing Sheets

METHOD FOR MONITORING THE EARTH SURFACE

BACKGROUND OF THE INVENTION

The invention is directed to a method for monitoring the earth's surface using synthetic aparture radar.

Monitoring of the surface of the earth is required for many applications. A moving aircraft, e.g. an airplane or a dirigible or a satellite, may be used, if the monitoring for the most part must be independent of the influence of weather conditions, e.g. clouds and/or fog, it makes sense to provide an aircraft with a radar sensor having a viewing direction toward the earth's surface. In the event that high spatial resolution must be achieved during the monitoring, it makes sense to use a radar sensor with a synthetic aperture. This radar sensor is operated, for example, in the so-called SAR mode or the DBS mode (operating mode). This type of radar monitoring requires that the flight parameters in particular are always known, e.g. flight elevation, flight path, and flight speed of the aircraft. Only if these are known can radar images, recorded successively in time with the synthetic aperture method, be evaluated with predetermined accuracy, without the occurrence of errors and/or interferences such as fuzzy images. The aforementioned flight parameters can be determined, for example, with an INS (inertial navigation system).

Such a method has the disadvantage of being technically involved and not cost-effective because an autonomous device, the INS device, must be used to determine the parameters, required in particular for SAR radar images.

SUMMARY OF THE INVENTION

It is thus the object of the invention to specify a method of the type discussed above, which permits in a cost-effective manner an automatic focusing of radar images, generated with the aid of a radar sensor with a synthetic aperture.

This object is solved with a monitoring system which is characterized in that the transmitting/receiving antenna of the radar sensor is designed such that in the region to be monitored, an illuminated spot for the antenna is generated, which is adapted to a specifiable spatial resolution; a radar image is generated from the received radar signals through superimposing Fourier spectra, which have been processed block-by-block with respect to the range and/or the Doppler signal. By correlating such Fourier spectra, which succeed each other in time, in the azimuth and elevation dimensions, it is possible to determine the parameters acceleration on the line of sight ($B_{los}$), as well as ambiguity errors on the line of sight ($M_{los}$). The remaining speed on the line of sight ($R_{los}$) is determined within an ambiguity range by estimating the echo center of gravity of the Doppler signal within the Fourier spectra. A definite speed is determined on the line of sight ($V_{los}$) in accordance with the following formula:

$$(V_{los}) = (M_{los}) \cdot \lambda B_m/2 + R_{los},$$

wherein

·=multiplication operator $\lambda$=radar wave length; and $B_m$=measuring band width of the radar sensor in Doppler.

The parameters phase correction range (+e,dus $\phi_r$) and phase correction Doppler (+e,dus $\phi_d$), which are necessary to focus the radar images, are determined from the acceleration on the line of sight ($B_{los}$) and the speed on the line of sight ($V_{los}$).

BRIEF DESCRIPTION OF THE DRAWINGS

The invention is explained in further detail in the following with the aid of an exemplary embodiment and by referring to the schematically illustrated figures, wherein.

DESCRIPTION OF THE PREFERRED EMBODIMENTS

The invention is based on the realization that it is possible to determine from the radar signal, analyzed by the radar sensor, the speed and acceleration on the line of sight, meaning the connecting line between the radar sensor and the illuminated spot for the antenna on the earth surface. These develop as a result of apparent motions of the radar sensor relative to the earth surface, particularly for a fast-moving aircraft. Such parameters, obtained during the analysis of the radar signals, are used to determine the parameters that are necessary for focusing the image.

For this, the radar sensor analyzes a predetermined region of the earth's surface to be monitored in the SAR scan mode, the spotlight mode and/or the MTI mode. An angle tracking of a detected target is possible if the radar sensor is operated in the monopulse mode. In that case, it is particularly advantageous if the radar sensor can process the received signals in real-time.

Figure 1:
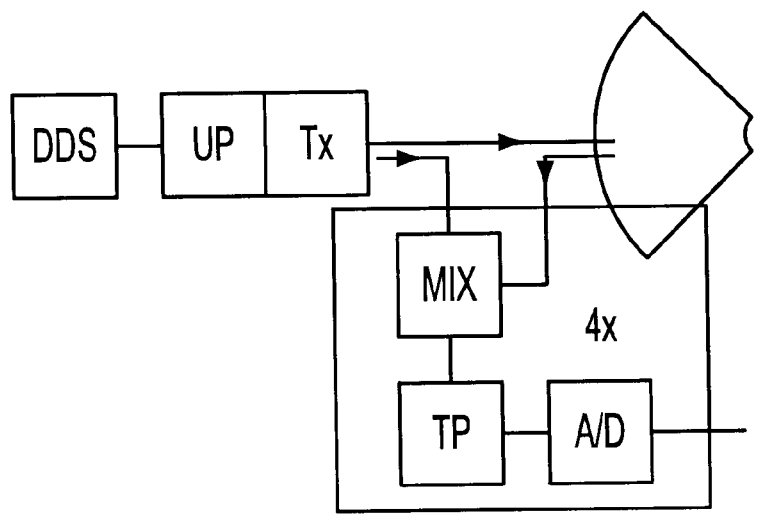
FIGS. 1 to 7 are schematic diagrams for explaining the invention.

FIG. 1 shows a diagram of the design for a transmitting/receiving unit of a radar sensor in the millimeter wave range (mmw). The following features are used in this case for the radar sensor:

radar frequency range 35 Ghz ($K_a$ band);

modulation method: linear FM-CW;

full inter-ramp coherence;

narrow beam transmitting/receiving antenna of the Cassegrain type;

antenna on a stabilized platform;

4-channel monopulse system; and two orthogonal received polarizations that are coupled with the two angular planes (azimuth and elevation).

According to FIG. 1, a FM modulation signal is generated with digital direct synthesis (DDS) and is fed via an up converter (UP) to a HF transmitter. The echo signal from the four receiving channels is respectively mixed (MIX) with the decoupled transmitting signal and, following a low-pass filtering (TP), is scanned or sampled (digitized) (A/D) (homodyne method). A cardanic system with position stabilization of the antenna (platform) permits an orientation of the antenna in the azimuth range over more than 180° (parallel to the earth surface), symmetrical to the flight direction (meaning a so-called "forward looking" and "side looking" to the right or left is possible), as well as over more than 90° in the elevation range (perpendicular to the earth surface).

Figure 2:
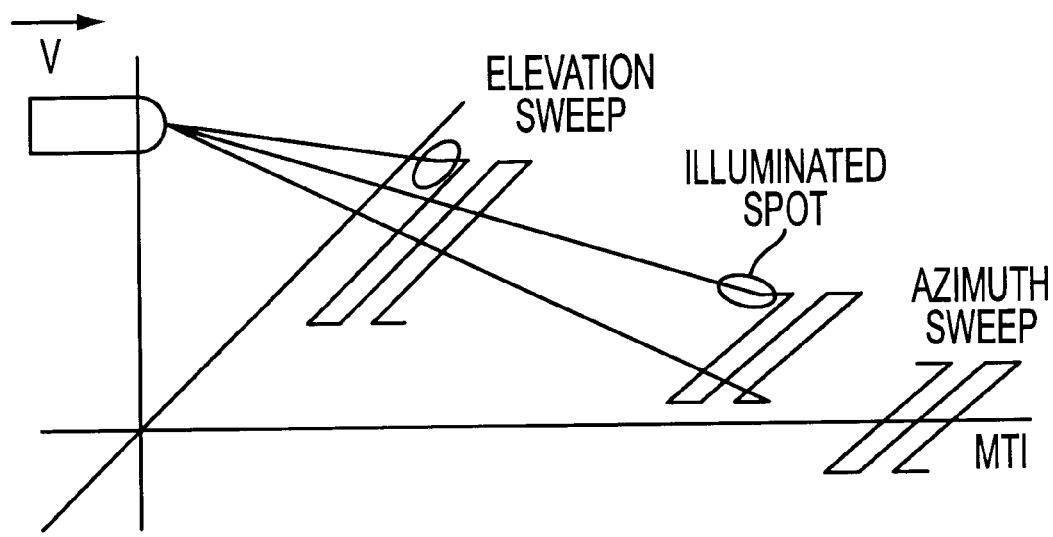

As a result of the selected antenna design, a narrow antenna characteristic is produced, which is necessary for a possible target tracking, as well as a good output balance. A high spatial resolution is achieved through a correspondingly selected band width for the transmitting signal, as well as a coherent integration time that is adapted to this. The illuminated antenna spot on the earth surface has dimensions of, for example, 100 m to 150 m which, together with the previously mentioned position stabilized platform, makes it possible to conduct, for example, a meandering scanning in a specifiable azimuth/elevation range (FIG. 2). The dwell time for a (radar) target to be detected and/or classified in the antenna lobe is essentially determined by a specifiable antenna search pattern, e.g. a meandering scanning. In that case, an increase in the Doppler resolution requires a reduction in the otherwise selected, specifiable search strip width or an interruption over a predetermined period of time. Such interruptions are necessary, e.g. for an exact analysis of a detected target (classification). In dependence on the available target scenario, this occurs in a so-called "spotlight mode" or a search sweep with a very low, specifiable sweeping speed.

The so-called MTI mode of the radar sensor is used for the azimuth sweep symmetrical to the flight direction. In that case and with unchanged transmitting modulation and signal pre-processing, a possibly existing ground clutter is imaged in this viewing direction on just a few resolution cells of the Doppler spectrum because of the selected narrow Doppler band width. Driving (moving) targets consequently appear primarily outside of this range, in the thermal noise. The existing high range resolution is maintained and is used for the target recognition.

Figure 3:
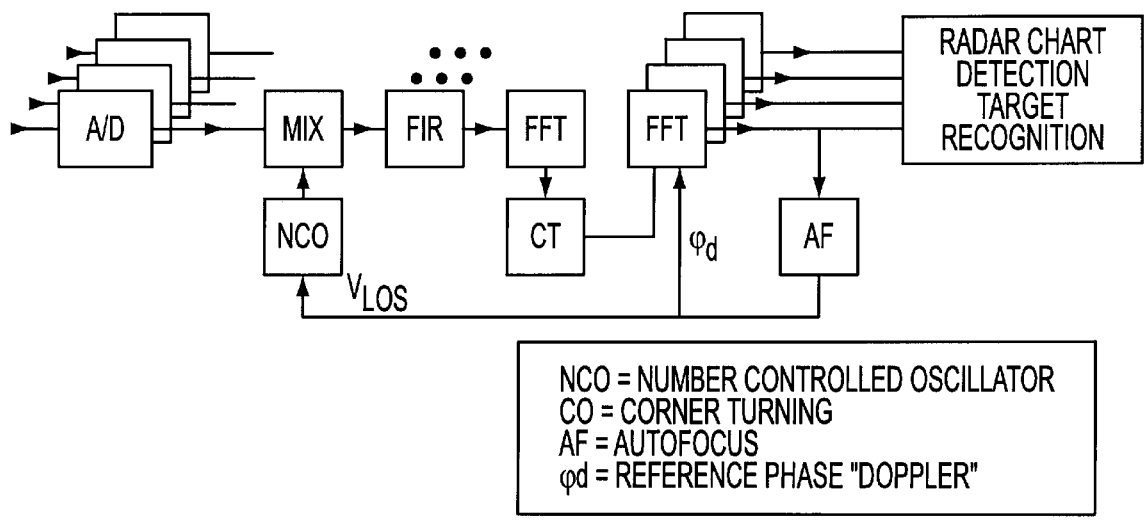

FIG. 3 shows an arrangement for analyzing the received signals (echo signals). In that case, the four received signals are initially digitized (A/D) and parallel-processed (processed). Initially, the analysis window for the "range" (distance) is selected via a digital synthesizer, as well as a FIR filter. Prior to the further signal processing, the signal is subsampled or sub-scanned, based on the band width reduction of the FIR filter.

Following a phase compensation, the existing, small dimension of the illuminated antenna spot on the earth surface permits a simple range-Doppler-processing (distance Doppler processing) of the signals, a method known per se, since the objects (targets) of interest are located within the depth of sharpness range ("depth of focus"), even with a high lateral resolution of, for example, less than 1 m. Individual, so-called footprint images are generated for this with a block processing method in a fixed, predetermined time grid. These images strongly overlap in the aperture, as specified, and are assembled on the basis of the so-called multilook principle to form larger images, depending on the search pattern. The previously mentioned high range resolution (distance resolution) of less than 1 m requires an very exact determination of the speed $V_{los}$ on the line of sight. The same is true for the low-frequency share of the acceleration $B_{los}$ on the line of sight where the gravity contribution cannot be compensated exactly, owing to the unavoidable uncertainty when directing the antenna.

Signals for which the highest frequency is lower than the inverse value of the coherent integration time, explained in more detail in the following, are herein referred to as low-frequency signals. Low-frequency signals can be found, for example, in a frequency range of 1 Hz to 10 Hz.

Figure 4:
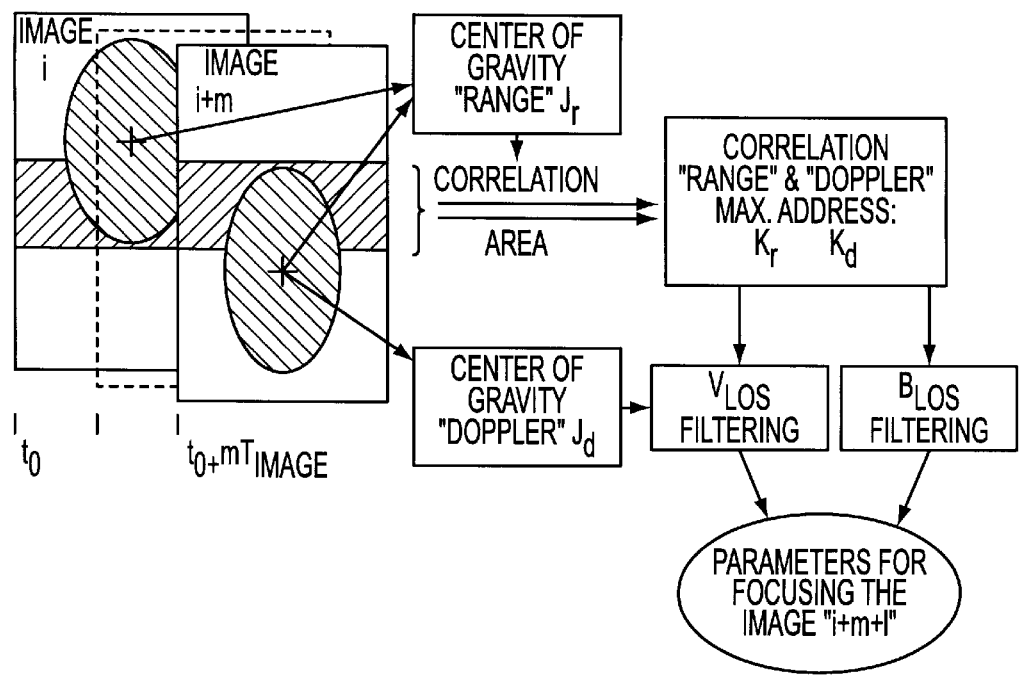

The auto-focusing carried out with this is incorporated into the block processing of the signals in such a way that time-consuming iterations are advantageously avoided. For the signal processing, the method known as "mapdrift" from the literature reference "Spotlight Synthetic Aperture Radar: Signal Processing Algorithms, Walter G. Carrara, Ros S. Goodman and Ronald M. Majewski, Artech House, 1995," is modified according to FIG. 4 in such a way that the speed $V_{los}$ and the low-frequency share of the acceleration $B_{los}$ can be determined simultaneously.

The incoherently composed radar images are used as basis for detecting a target and supporting the aircraft navigation, whereas the complex individual images from the four receiving channels in two polarizations are available for the target analysis.

In the following, the determination of the speed $V_{los}$ and the acceleration $B_{los}$ on the line of sight is explained in further detail.

The SAR and the DBS technology can supply the required resolution. For this technology, a radar signal with wide band width $B_r$ is transmitted (transmitting signal $S_r$) with suitable modulation within a short frame cycle $T_r$, and its echo is received ($E_r$), is scanned with the clocking frequency $T_s$ and is processed ($N_s$ scanning values within the clocking frequency $T_s$).

The transmitting signal $S_r$ is repeated periodically via a specifiable number $N_r$ of frame cycles $T_r$. The coherent processing of the received signal $E_r$ leads to a two-dimensional spectrum of the "range" and "Doppler" dimensions, wherein with a suitably selected measuring geometry, the Doppler dimension provides the local resolution lateral to the range axis ("azimuth").

The following correlations apply:
Range resolution:

$$\delta R = \frac{c}{2B_r}$$

Measuring band width for Doppler:

$$B_{md} = \frac{1}{T_r}$$

Doppler resolution:

$$\delta D = \frac{B_{md}}{N_r}$$

Azimuth resolution:

$$\delta Az = \frac{\lambda}{2\Omega}$$

c=speed of light; λ=radar wave length;
Ω—angle difference to the target object within the integration time $T_{int}=N_r T_r$.

The processing of the $N_r$ received signals $E_r$ for the herein described method occurs as two-dimensional Fourier transformation of the matrix.

$\underline{\underline{E_{tt}}}=[E_r(T_r) \ldots E_r(N_r T_r)]$ after the matrix $\underline{\underline{E_{tt}}}$ phase has been corrected as specified. In this as well as the following formulas, letters with double underlining designate a matrix and letters with single underlining designate a vector. This so-called range Doppler processing ensures that the radar images are focused within the depth of focus ΔR, resulting from the following formula:

$$\Delta R \approx \frac{2\delta r^2}{\lambda}$$

(δr = resolution for the range as well as the azimuth)

A method for determining the correction phases of the matrix $\underline{\underline{E_{tt}}}$ is explained in the following, which can be used for sequentially generated range Doppler images.

Marginal Conditions

Figure 5:
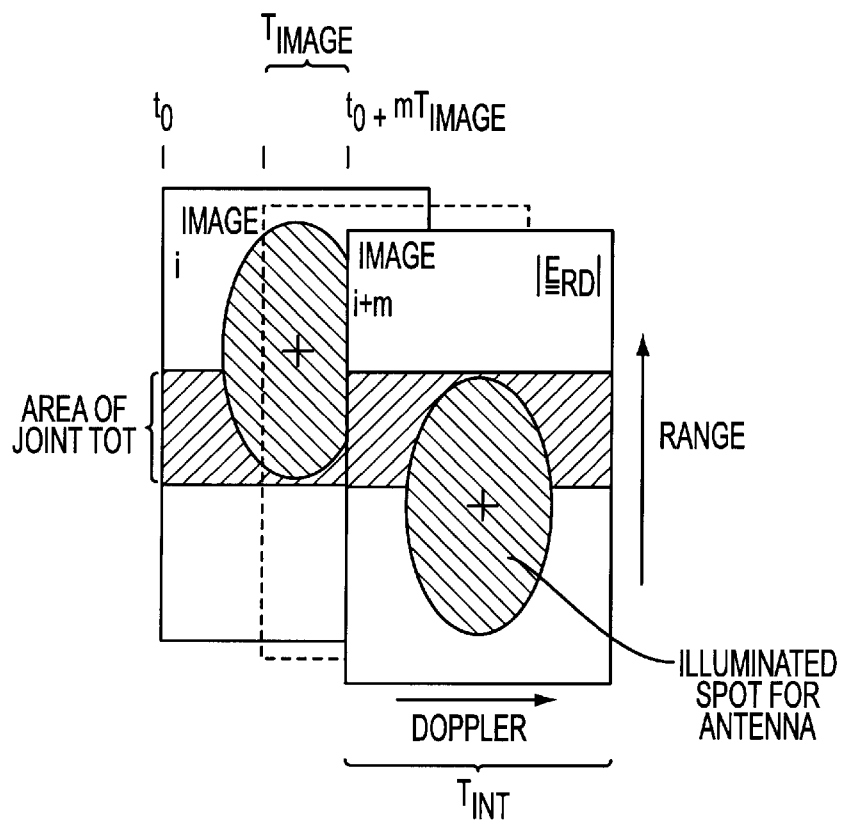

A coherent integration time $T_{int}$ is selected, which cannot last any longer than approximately ½ the target illumination time TOT ("time on target"). The DBS image generating process is repeated at timed intervals $T_{image}$(image cycle), wherein the (not necessarily constant) time interval $T_{image}$ is measured such that several images can be computed during the time on target TOT, which together contain echo signals from the total time on target TOT (FIG. 5). These procedural steps are in the following called block processing, wherein each block is defined by the matrix $\underline{\underline{E}}_{tt}$.

Signal Processing

Figure 6:
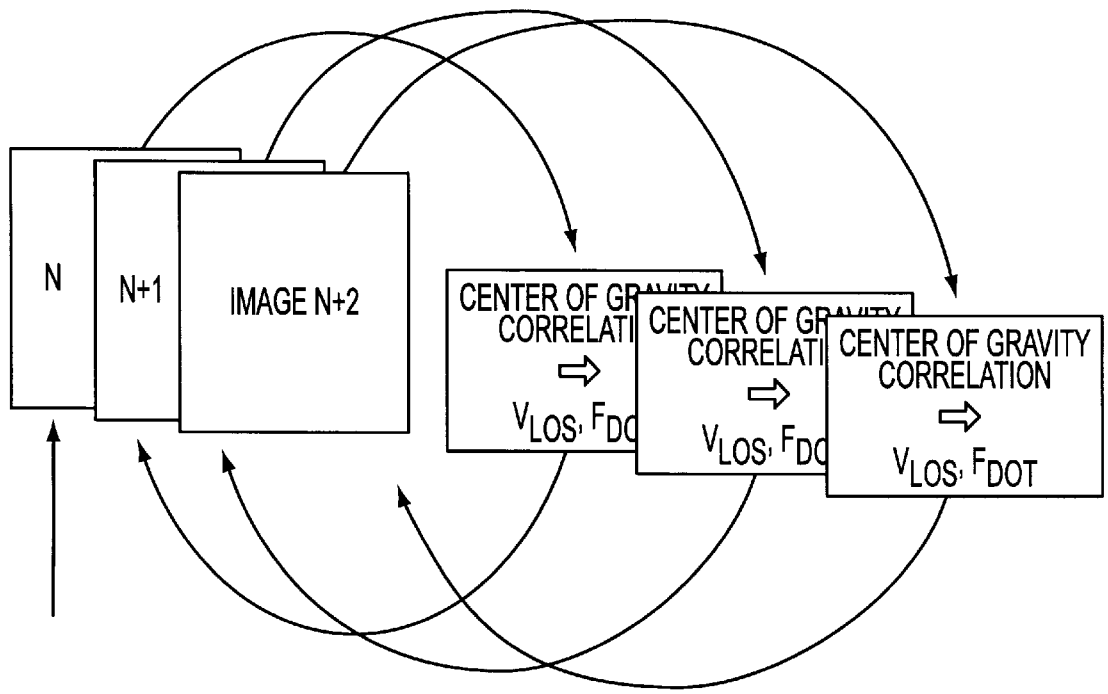

The signal processing process is shown diagrammatically in FIG. 6. The sequence in time is as follows:

a) Generating the $\underline{\underline{E}}_{tt}$ spectrum:

$$\underline{\underline{E}}_{tt} => e^{i\phi R}\circ => FFT\text{"range"} => e^{i\phi R}\circ FFT\text{"Doppler"} => \underline{\underline{E}}_{RD}$$

or $$\underline{\underline{E}}_{tt} => e^{i\phi R}\circ e^{i\phi R}\circ => FFT\text{"range"} => FFT\text{"Doppler"} => \underline{\underline{E}}_{RD},$$

wherein $\underline{\underline{E}}_{RD}$ is the spectrum belonging to the matrix $\underline{\underline{E}}_{tt}$ and $\circ$ represents the linking operator.

The phase correction +e,dus $\phi_r$ amounts to:

$$\varphi_R(n_s, n_r) = 4\Pi \cdot V_{Los} \cdot \frac{n_r \cdot T_r}{N_r} \cdot \frac{n_s}{N_s}$$

$$n_s = 0...N_s - 1, n_r = 0, ...N_r - 1$$

$V_{los}$=up-to-date measured value for the line of sight speed.

The phase correction +e,dus $\phi_d$ is:

$$\varphi_d(n_s, n_r) = \Pi \cdot F_{dOT} \cdot n_r^2 \quad \begin{array}{l} n_r = -N_r/2...N_r/2 - 1 \\ = \text{change in Doppler frequency,} \end{array}$$

$$F_{dOT} = \frac{2}{\lambda} B_{LOS}$$

$B_{LOS}$=up to date measured value for the line of sight acceleration.

b) Obtaining $V_{LOS}$ and $F_{DOT}$ from the spectrum $\underline{\underline{E}}_{RD}$:

i) Measuring the echo center of gravity in "range" $J_r$ and "Doppler" $J_d$ ii) Correlation of $|\underline{\underline{E}}_{RD}|(t_0)$ and $|\underline{\underline{E}}_{RD}|(t_0\text{-}mT_{image})$ along the "range" and the "Doppler,"

wherein the total number m is selected such that $|\underline{\underline{E}}_{RD}|(t_0)$ and $|\underline{\underline{ERD}}|(t_0\text{-}mT_{image})$ is measured within the time on target TOT of a point target.

The correlation occurs at a section of the range that is symmetrical to the average value from $J_r(t_0)$ and $J_r(t_0+mT_{image})$. The correlation is cyclical along the "Doppler" dimension.

The maxima of the correlation function for positions $K_r$ and $K_d$ are located in the "range" or "Doppler" dimension.

iii) Determination of $V_{LOS}$ from $K_r$ and $J_d$:

The echo center of gravity in "Doppler" measures the frequency:

$$f_{Jd} = \frac{J_d}{N_r} B_{md}$$

respectively the speed $$R_{los} = \frac{\int_{Jd} \lambda}{2}$$

The correlation measures the speed:

$$V_{korr} = K_r \frac{\delta R}{\Delta T} = K_r \frac{c}{2B_r mT_{picture}}$$

The ambiguity share in the Doppler frequency $M_{los}M_{los}\epsilon Z$ (total number), and thus also $V_{LOS}$, is determined with:

$$v_{korr} = \frac{!\lambda}{2} \left( \int_{Jd} + M_{los} B_{md} \right) \equiv V_{LOS}$$

iv) Determination of $F_{DOT}$ from $K_d$:

$$F_{dOT} = \frac{K_d}{mT_{picture}T_{integrate}}$$

(*MAPDRIFT* autofocus according to the literature)

c) Filtering $V_{LOS}$ and $F_{DOT}$:

The measuring band width for $V_{LOS}$ and $F_{DOT}$ is $1/mT_{image} \approx 1/T_{integrate}$. A specifiable, non-linear filter (Median or Sigma filter) eliminates interferences occurring as a result of poor measuring quality (lack of inhomogeneity of the radar echo for the correlation).

The contrast of the correlation maxima at $K_r$ or $K_d$ controls an adaptive low-pass filter, so that the resulting measuring band width<$1/mT_{image}$.

d) Generate new image:

$t_0 \rightarrow t_0 + T_{image}$; see section a).

Testing the Method

Figure 7:
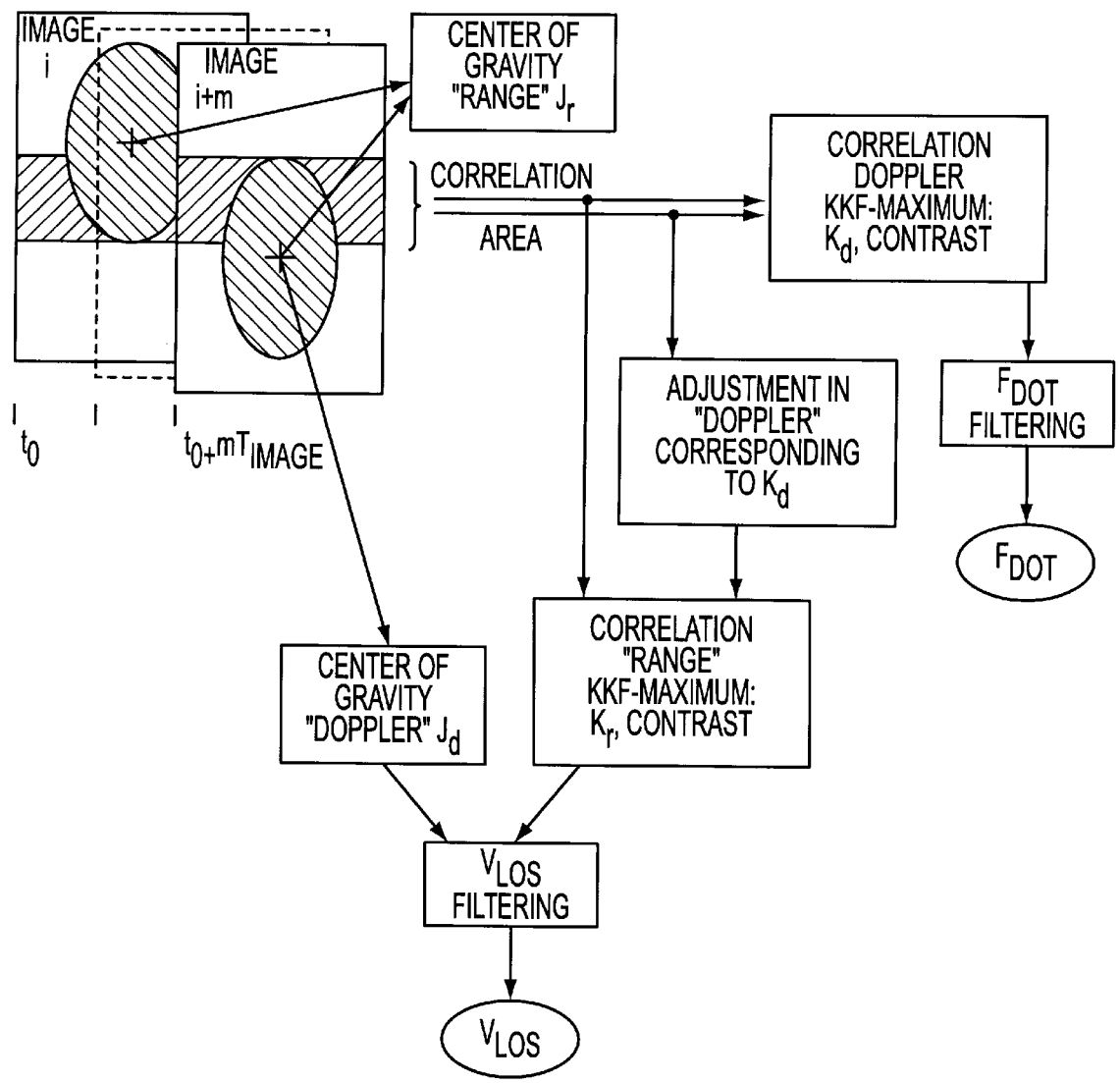

The method was used successfully with measured data from a Ka-band radar sensor, wherein resolutions below 1 m×1 m were achieved. Depending on the measuring scenario, there is a "transient phase" of 2 to 15 image cycles until focused images are achieved. If necessary, this phase can be shortened if supported by INS information. The 2-dim correlation can be taken back to two 1-dim correlations if the Doppler correlation is initially carried out and the Doppler offset $K_d$ is then taken into account for the range correlation (see FIG. 7).

With such a method, for example, it is possible to produce a radar sensor for the following operating conditions:

for manned or unmanned subsonic aircraft;

for a sensor range of several kilometers;

for a search strip width of several kilometers;

for an autonomous target recognition and target tracking within the search area, e.g. for an unmanned aircraft;

for an exact target survey with a point of impact selection;

for a reliable monitoring operation, even if weather conditions are unfavorable, for example if weather conditions are poor (rain, snow and/or clouds).

The invention is not limited to the above-described examples, but can be used in many different ways, e.g. for the detection, classification and tracking of stationary as well as moving objects, such as land vehicles and/or ocean-going vehicles (ships).

What is claimed is:

1. A method for monitoring the earth's surface by using an aircraft having a synthetic aperture radar sensor, comprising the steps of:
   (a) using a transmitting/receiving antenna of the radar sensor to illuminate a spot in a region to be monitored, the illuminated spot having a predetermined spatial resolution;
   (b) receiving, radar signals via the transmitting/receiving antenna;
   (c) generating a radar image from the received radar signals through superimposing Fourier spectra, which succeed each other in time and which have been processed block-by-block with respect to a range parameter and a Doppler parameter;
   (d) determining acceleration on a line of sight ($B_{los}$) between the illuminated spot and the transmitting/receiving antenna, as well as ambiguity errors on the line of sight ($M_{los}$), step (d) including correlating the Fourier spectra in an azimuth dimension and an elevation dimension;
   (e) determining a speed component on the line of sight ($R_{los}$) within an ambiguity range by estimating an echo center of gravity of the Doppler parameter within the Fourier spectra;
   (f) determining a definite speed on the line of sight ($V_{los}$) in accordance with the following formula:

$$(V_{los}) = M_{los} \cdot \lambda B_m/2 + R_{los},$$

wherein
   · = multiplication operator
   $\lambda$ = radar wave length; and
   $B_m$ = measuring band width of the radar sensor in Doppler; and
   (g) determining a phase correction "range" parameter (+e,dus $\phi_r$) and a phase correction Doppler parameter (+e,dus $\phi_d$), which are necessary for focusing radar images, from the acceleration on the line of sight ($B_{los}$) and the speed on the line of sight ($V_{los}$).

2. A method for monitoring the earth's surface according to claim 1, wherein the acceleration on the line of sight ($B_{los}$) and the speed on the line of sight ($V_{los}$) are determined from the low-frequency signal components.

3. A method for monitoring the earth's surface according to claim 2, wherein the low-frequency signal components for the acceleration on the line of sight ($B_{los}$) and for the speed on the line of sight ($V_{los}$) are determined by using an estimation process.

4. A method for monitoring the earth's surface according to claim 1, wherein, for the Fourier spectra that have been processed block-by-block, a block length is selected such that at least two blocks are detected within a time on target.

5. A method for monitoring the earth's surface according to claim 1, wherein, in order to determine the parameters acceleration on the line of sight ($B_{los}$) and speed on the line of sight ($V_{los}$), these parameters are correlated with respect to at least one predetermined spectral range.

6. A method for monitoring the earth's surface according to claim 1, wherein the echo center of gravity of the Doppler parameter within the Fourier spectra represents an estimate for the speed component on the line of sight ($R_{los}$) within the ambiguity range.

7. A method for monitoring the earth's surface according to claim 1, wherein the low-frequency signal components for the speed on the line of sight ($V_{los}$) and the acceleration on the line of sight ($B_{los}$) are obtained through a filtering of estimated values, determined during an operating cycle, and wherein a limit frequency is selected to be lower than a value $1/T_{int}$ and $T_{int}$ stands for a coherent integration time.

8. A method for monitoring the earth's surface by using an aircraft having a synthetic aperture radar sensor, comprising the steps of:
   (a) using a transmitting/receiving antenna of the radar sensor to illuminate a spot in a region to be monitored, the illuminated spot having a predetermined spatial resolution;
   (b) receiving radar signals via the transmitting/receiving antenna;
   (c) generating a radar image from the received radar signals through superimposing Fourier spectra, which succeed each other in time and which have been processed block-by-block with respect to a Doppler parameter;
   (d) determining acceleration on a line of sight ($B_{los}$) between the illuminated spot and the transmitting/receiving antenna, as well as ambiguity errors on the line of sight ($M_{los}$), step (d) including correlating the Fourier spectra in an azimuth dimension and an elevation dimension;
   (e) determining a speed component on the line of sight ($R_{los}$) within an ambiguity range by estimating an echo center of gravity of the Doppler parameter within the Fourier spectra;
   (f) determining a definite speed on the line of sight ($V_{los}$) in accordance with the following formula:

$$(V_{los}) = (M_{los}) \cdot \lambda B_m/2 + R_{los},$$

wherein
   · = multiplication operator
   $\lambda$ = radar wave length; and
   $B_m$ = measuring band width of the radar sensor in Doppler;
   (g) determining a phase correction "range" parameter (+e,dus $\phi_r$) and a phase correction Doppler parameter (+e,dus $\phi_d$), which are necessary for focusing radar images, from the acceleration on the line of sight ($B_{los}$) and the speed on the line of sight ($V_{los}$).

9. A method for monitoring the earth's surface according to claim 8, wherein the acceleration on the line of sight ($B_{los}$) and the speed on the line of sight ($V_{los}$) are determined from the low-frequency signal components.

10. A method for monitoring the earth's surface according to claim 9, wherein the low-frequency signal components for the acceleration on the line of sight ($B_{los}$) and for the speed on the line of sight ($V_{los}$) are determined by using an estimation process.

11. A method for monitoring the earth's surface according to claim 8, wherein for the Fourier spectra that have been processed block-by-block, a block length is selected such that at least two blocks are detected within a time on target.

12. A method for monitoring the earth's surface according to claim 8, wherein, in order to determine the parameters' acceleration on the line of sight ($B_{los}$) and speed on the line of sight ($V_{los}$), these parameters are correlated with respect to at least one predetermined spectral range.

13. A method for monitoring the earth's surface according to claim 8, wherein the echo center of gravity of the Doppler parameter within the Fourier spectra represents an estimate for the speed component on the line of sight ($R_{los}$) within the ambiguity range.

14. A method for monitoring the earth's surface according to claim 8, wherein the low-frequency signal components for the speed on the line of sight ($V_{los}$) and the acceleration on the line of sight ($B_{los}$) are obtained through a filtering of estimated values, determined during an operating cycle, and wherein a limit frequency is selected to be lower than a value $1/T_{int}$ and $T_{int}$ stands for a coherent integration time.

* * * * *